C. W. KOHLER, H. A. HOFFMAN AND W. B. FREEMAN.
METHOD AND APPARATUS FOR SEPARATING RUBBER AND FIBER.
APPLICATION FILED JUNE 23, 1920.
1,401,795.
Patented Dec. 27, 1921.
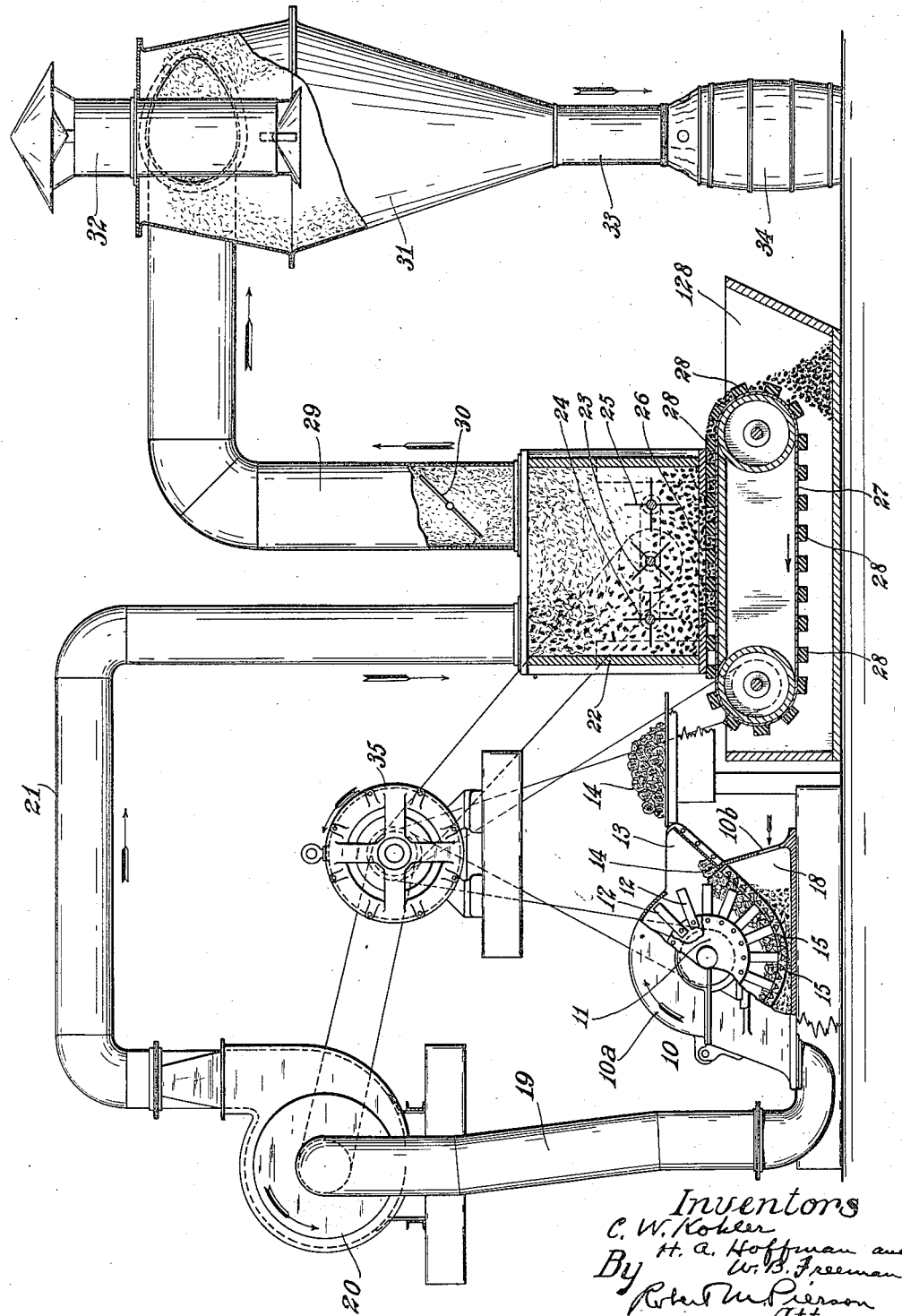
Inventors
C. W. Kohler
H. A. Hoffman and
W. B. Freeman
By Robert M. Pierson
Atty.

UNITED STATES PATENT OFFICE.

CHARLES W. KOHLER AND HARRY A. HOFFMAN, OF AKRON, AND WALTER B. FREEMAN, OF CUYAHOGA FALLS, OHIO, ASSIGNORS TO THE B. F. GOODRICH COMPANY, OF NEW YORK, N. Y., A CORPORATION OF NEW YORK.

METHOD AND APPARATUS FOR SEPARATING RUBBER AND FIBER.

1,401,795.      Specification of Letters Patent.      Patented Dec. 27, 1921.

Application filed June 23, 1920. Serial No. 391,178.

*To all whom it may concern:*

Be it known that we, CHARLES W. KOHLER and HARRY A. HOFFMAN, citizens of the United States, residing at Akron, and WALTER B. FREEMAN, a citizen of the United States, residing at Cuyahoga Falls, in the county of Summit and State of Ohio, have invented a certain new and useful Method and Apparatus for Separating Rubber and Fiber, of which the following is a specification.

This invention relates to the art of separating rubber and fiber from each other, especially when combined in cured scrap such as fragments of old pneumatic tires, belts, etc., although the invention is also applicable to the recovery of these materials from uncured cord-tire scrap, friction scrap, etc.

The art of reclaiming or recovering these materials has heretofore been confined, so far as we are aware, to chemical methods, which usually result in destroying the fiber, and to wet mechanical methods which, while enabling a considerable part of the fiber to be recovered, are objectionable on account of the drying step required.

The object of this invention is to separate the rubber and the fiber in a dry state, without the use of chemicals or water, and to recover a large part of both the rubber and the fiber, thus overcoming the disadvantages above mentioned.

The accompanying drawing is a diagrammatic side elevation, partly in section, of an apparatus embodying and adapted to carry out our invention.

For breaking up the scrap material we prefer to employ a device known as a shredder, shown at 10 in the drawings and embodying a rapidly-revolving rotor provided with a series of pivoted flails, arms or hammers which coöperate with a series of transverse stationary bars or knives to tear the material apart. $10^a$ is the casing of the shredder, and 11 is the rotor including a circular series of pivoted hammers 12. 13 is the feed hopper for the scrap 14, and 15, 15 are transverse bars or knives of triangular section forming a bottom grating against which the outer ends of the rapidly-revolving, centrifugally-actuated hammers force the scrap and tear or shred it apart. The shredded material passes through the grating into a receiving chamber 18, which has an air inlet $10^b$, and from said chamber it is discharged through an outlet pipe 19 leading to a fan blower 20. From said blower a delivery pipe 21 leads into a separating chamber 22 which it enters with a downward discharge.

In the lower part of the chamber 22 are a series of rotary paddles or agitators 23, 24, 25 for stirring the rubber particles to assist in liberating the loose fiber. The floor of said chamber is formed with a relatively-large opening 26 directly under which runs the upper stretch of an endless-belt off-take conveyer 27 provided with cross slats or bars 28 of uniform thickness, preferably made of a yielding material such as sponge rubber, for discharging from the separator the rubber lumps or particles which fall to the bottom thereof. 128 is a receptacle positioned to receive material from said conveyer.

29 is a discharge pipe leading off from the top of the separator in an upward direction and provided with a pivoted valve or damper 30. This pipe enters tangentially the upper part of the casing of a device 31 known as a cyclone separator which has a baffled pipe 32 taking the air current upwardly from an intermediate point in the separating chamber and discharging it into the atmosphere, said separating chamber being of such capacity that the air current slows down considerably in making the turn into the up-take pipe 32 and allows the fiber to fall by gravity into the conical lower portion of the chamber and be discharged through a bottom pipe 33 into a barrel 34.

The several pipes, separator casings and blower casing form a continuous conduit for the passage of the air current, containing the propelling and separating instrumentalities. The various moving parts are driven by an electric motor 35 through suitable belts and pulleys, but we have not attempted to show the necessary pulley ratios to give the proper relative speeds to these parts.

In operation, the rubber scrap 14 is fed into the hopper of the shredder 10, where the hammers 12, acting in conjunction with the bars 15, tear it apart and loosen the hold of the rubber upon the fabric, besides also disintegrating the fabric into its threads and fibers but without breaking or grinding up the fibers into very short lengths. The rubber is broken into small lumps or particles and passes, together with the fiber, through the grating into the chamber 18. From there, the air current caused by the fan blower 20 carries off the shredded material into the separating chamber 22.

As the current enters said chamber in a downward direction from above, slows down in said chamber due to the latter's capacity and leaves in an upward direction, the rubber particles, being heavier than the fiber, continue downward to the lower region of the chamber, due to their momentum as well as gravity, while the fiber particles make the turn and are carried upwardly out of the chamber through the pipe 29 and on into the cyclone air-separator 31. The agitators 23, 24, 25, keep the rubber particles in the lower part of the chamber 22 stirred up and assist in liberating into the air current any loose fibers still mixed with the rubber. Damper 30 enables the speed of the air current to be regulated so as to get the best separating effect. In the cyclone separator, the combined action of the centrifugal air swirl, and the forces of gravity and momentum carry the particles of fiber to the sides of the separating chamber and allow them to fall down the sloping walls thereof while the air makes the turn into the pipe 32 and passes out in an upward direction, the fiber being finally collected in the receptacle 34.

The foregoing principles of operation may be carried out in different ways, and the character of the several instrumentalities may be considerably varied without departing from our invention.

We claim:

1. The method of separately recovering fiber and rubber from a disintegrated mixture of the two which comprises propelling the mixture on an air current, selectively separating the rubber from the mixture and then separating the fiber from the air current.

2. The herein-described method which comprises mechanically shredding a rubber and fiber structure, propelling the disintegrated mixture on an air current, and producing a change in direction of the air-current and fiber to cause a separation of the rubber from the current.

3. The method of separately recovering rubber and fiber from scrap which comprises shredding said scrap, propelling the shredded material in an air current, selectively separating the rubber particles therefrom, and then removing the fiber particles from the air current by centrifugal action.

4. The method of separately recovering rubber and fiber from scrap which comprises disintegrating said scrap, propelling the resulting mixture downward with an air current, producing a change of direction of the air current to carry off the lighter fiber particles while the rubber particles leave said current by reason of their momentum and gravity, and then removing the fiber particles from the air current.

5. In a rubber-fiber reclaiming apparatus, the combination of a shredder, means for causing an air current to carry away the shredded material, means for separating the rubber particles out of said air current and means for separating the fiber particles out of said air current.

6. In a rubber-fiber reclaiming apparatus, the combination of a shredder, a conduit having a fan blower for carrying away the shredded material, and a separator having means for receiving and discharging the air current and for abruptly changing its direction to separate the rubber particles from the current.

7. In a rubber-fiber reclaiming apparatus, the combination of a shredder, an offtake conduit leading therefrom and having means for creating an air current, a rubber separator in the course of said conduit, and a cyclonic fiber separator in the course of the conduit posterior to said rubber separator.

8. In a rubber-fiber reclaiming apparatus, the combination of a shredder, an offtake conduit leading therefrom and having a fan blower, a gravity rubber separator and a fiber separator serially positioned in said conduit, and a valve in the conduit between said separators for regulating the speed of the air current in the rubber separator.

9. Apparatus for separately reclaiming rubber and fiber from scrap comprising means for disintegrating said scrap, a chamber, a conduit leading from said disintegrating means and passing downward into said chamber, a conduit leading upward out of said chamber, and means posterior to said chamber for separating fiber from an air current passing through said conduit.

10. Apparatus for separately reclaiming rubber and fiber from scrap comprising means for disintegrating said scrap, a chamber having an open bottom, a conduit leading from said disintegrating means and passing downward into said chamber, a conduit leading upward out of said chamber, and an endless carrier adapted substantially to close the bottom of said chamber but to receive and carry material therefrom.

11. Apparatus for separately reclaiming rubber and fiber from scrap comprising means for disintegrating said scrap, a chamber, a conduit leading from said disintegrating means and passing downward into said chamber, a conduit leading upward out of said chamber, means for removing material from the bottom of said chamber without substantially opening said chamber to the outer air, and means for agitating the material within said chamber.

In testimony whereof we have hereunto set our hands this 16th day of June, 1920.

CHARLES W. KOHLER.
HARRY A. HOFFMAN.
WALTER B. FREEMAN.